US009686641B2

(12) United States Patent
Cui et al.

(10) Patent No.: US 9,686,641 B2
(45) Date of Patent: Jun. 20, 2017

(54) NOTIFICATION METHOD, NOTIFICATION SYSTEM AND TERMINAL FOR SCENERY ARE ABASED ON AD HOC NETWORK

(75) Inventors: Jie Cui, Shenzhen (CN); Wei Zou, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/394,202

(22) PCT Filed: Jun. 18, 2012

(86) PCT No.: PCT/CN2012/077113
§ 371 (c)(1),
(2), (4) Date: Nov. 10, 2014

(87) PCT Pub. No.: WO2013/155781
PCT Pub. Date: Oct. 24, 2013

(65) Prior Publication Data
US 2015/0080028 A1    Mar. 19, 2015

(30) Foreign Application Priority Data

Apr. 19, 2012 (CN) .......................... 2012 1 0117463

(51) Int. Cl.
*H04W 4/02* (2009.01)
*H04W 4/20* (2009.01)
(Continued)

(52) U.S. Cl.
CPC ............. *H04W 4/02* (2013.01); *H04W 4/206* (2013.01); *H04W 64/00* (2013.01); *H04W 4/028* (2013.01); *H04W 84/18* (2013.01)

(58) Field of Classification Search
CPC ....... H04W 4/028; H04W 4/206; H04W 4/02; H04W 84/18; H04W 64/00
See application file for complete search history.

(56) References Cited

U.S. PATENT DOCUMENTS 7,184,421 B1 * 2/2007 Liu ...................... H04L 12/189
370/254
8,693,372 B2 * 4/2014 Corson .................. H04L 45/02
370/255
(Continued)

FOREIGN PATENT DOCUMENTS

CN    101277266 A    10/2008
CN    101577954 A    11/2009
(Continued)

OTHER PUBLICATIONS

Supplementary European Search Report in European application No. 12874873.8, mailed on Apr. 14, 2015.
(Continued)

*Primary Examiner* — Kenneth Lam
(74) *Attorney, Agent, or Firm* — Oppedahl Patent Law Firm LLC

(57) ABSTRACT

Disclosed is a notification method for a scenery area based on an Ad Hoc network, including the following steps that: a guide information sending terminal is arranged at each scenery spot in the scenery area; the guide information sending terminal sends guide information periodically; a tourist terminal inside a radio transceiving range of the guide information sending terminal, after receiving the guide information, generates forwarded information and broadcasts it, and then sends reply information to the guide information sending terminal; a tourist terminal outside the radio transceiving range of the guide information sending terminal, after receiving the forwarded information, generates its own forwarded information and forwards it, and further judges whether itself is at the scenery spot where the guide information sending terminal is located according to the forwarded information, and if so, it sends reply information to the guide information sending terminal; and the guide information sending terminal determines the number
(Continued)

of tourists at the scenery spot where it is located according to the received reply information. The disclosure further discloses a corresponding system and a corresponding terminal, so that a tourist can know the number of tourists at each scenery spot.

10 Claims, 2 Drawing Sheets

(51) Int. Cl.
*H04W 64/00* (2009.01)
*H04W 84/18* (2009.01)

(56) References Cited

U.S. PATENT DOCUMENTS

| | | | |
|---|---|---|---|
| 2009/0016281 A1 | 1/2009 | Isozu et al. | |
| 2010/0302945 A1 | 12/2010 | Leppanen | |
| 2012/0134287 A1* | 5/2012 | Turunen | H04W 4/06 370/252 |
| 2012/0197898 A1* | 8/2012 | Pandey | H04L 67/12 707/741 |
| 2012/0243408 A1 | 9/2012 | Leppanen | |
| 2014/0349684 A1 | 11/2014 | Leppanen et al. | |

FOREIGN PATENT DOCUMENTS

| | | |
|---|---|---|
| CN | 101662403 A | 3/2010 |
| CN | 101896002 A | 11/2010 |

OTHER PUBLICATIONS

International Search Report in international application No. PCT/CN2012/077113, mailed on Jan. 31, 2013. (2 pages—see entire document).

English Translation of the Written Opinion of the International Search Authority in international application No. PCT/CN2012/077113, mailed on Jan. 31, 2013. (10 pages—see entire document).

* cited by examiner

NOTIFICATION METHOD, NOTIFICATION SYSTEM AND TERMINAL FOR SCENERY ARE ABASED ON AD HOC NETWORK

TECHNICAL FIELD

The disclosure relates to the technical field of Ad Hoc networks, and more particularly to a notification method, a notification system and a terminal for a scenery area based on an Ad Hoc network.

BACKGROUND

The Ad Hoc network is a special wireless mobile network, in which all the nodes are equal in status, so that no central control node is needed. The nodes in the network not only have a function required by a common mobile terminal but also have a packet forwarding function.

Generally, the Ad Hoc network has two structures: a planar structure and a hierarchical structure. The planar Ad Hoc network, in which all the nodes are equal in status, may also be called a peer-to-peer structure, while the hierarchical Ad Hoc network is divided into clusters each consisting of one cluster head and a plurality of cluster members. In the hierarchical Ad Hoc network, the cluster head node is responsible for data forwarding between clusters. The cluster head may be pre-assigned or automatically selected by the nodes by an algorithm.

The hierarchical Ad Hoc network may also be divided into a single-frequency hierarchical network or a multi-frequency hierarchical network. In the single-frequency hierarchical network, all the nodes communicate at one frequency and need the support of a gateway node to communicate with the cluster head, namely, needing the support of a node which belongs to two clusters at the same time, while in the multi-frequency hierarchical network, different nodes communicate at different frequencies. In a two-level network, the cluster head node has two frequencies, one of which is for the communication between a cluster head and a cluster member, and the other of which is for the communication between two cluster heads. The Ad Hoc network of the planar structure is very simple, and all the nodes in the network are completely equal, so that no bottleneck exists in principle and a failure may not occur easily. In the Ad Hoc network of the hierarchical structure, the cluster members have a very simple function and do not need to maintain complex routing information. The Ad Hoc network of the hierarchical structure has the defects that the nodes need to execute cluster head selection algorithm for the maintenance of the hierarchical structure and the cluster head node may become a bottleneck of the network. Therefore, when the network is on a small scale, the Ad Hoc network of the planar structure may be applied; and when the network is on a large scale, the Ad Hoc network of the hierarchical structure is applied. The disclosure is described based on the Ad Hoc network of the planar structure.

With the improvement of living standards of people, the demand for tourism is growing and the requirement on the touring environment is also rising. At present, a scenery area usually includes multiple scenery spots, which are far from one another. A tourist may prefer to visit a scenery spot where there are fewer tourists during the travelling. Whereas, in the existing technology, only the number of tourists at the whole scenery area can be counted and the number of tourists at each scenery spot cannot be counted, thereby, such requirements of users cannot be met.

SUMMARY

In view of this, the disclosure provides a notification method, a notification system and a terminal for a scenery area based on an Ad Hoc network, so that a tourist can know the number of tourists at each scenery spot conveniently.

To this end, the technical solution of the disclosure is implemented as follows.

The disclosure provides a notification method for a scenery area based on an Ad Hoc network, including the step that a guide information sending terminal is arranged at each scenery spot in the scenery area.

The method may further include that the guide information sending terminal sends guide information periodically; a tourist terminal inside the radio transceiving range of the guide information sending terminal, after receiving the guide information, generates forwarded information and broadcasts it, and then sends reply information to the guide information sending terminal;

a tourist terminal outside the radio transceiving range of the guide information sending terminal, after receiving the forwarded information, generates its own forwarded information and forwards it, and then judges whether itself is at the scenery spot where the guide information sending terminal is located according to the forwarded information, and if so, it sends a piece of reply information to the guide information sending terminal; and the guide information sending terminal determines the number of tourists at the scenery spot where it is located according to the received reply information.

The guide information may include the identifier (ID) of the scenery spot, the Serial Number (SN) of the guide information and the number of tourists (GC) nearby the scenery spot.

The forwarded information may include the ID of the scenery spot, the SN of the guide information, GC nearby the scenery spot, and the Address (AD) of the tourist terminal sending the forwarded information in the received guide information or forwarded information, and the retransmission number (RN) (i.e. the times of forwarding) of forwarded information.

The reply information may include the ID of the scenery spot where the guide information sending terminal receiving the reply information is located, AD1 of the tourist terminal sending the reply information, and AD2 of next hop receiving reply information.

The step that the tourist terminal judges whether itself is located in the scenery spot where the guide information sending terminal is located according to the forwarded information may include that:

the tourist terminal outside the radio transceiving range of the guide information sending terminal determines whether itself is located at the scenery spot labelled with the ID according to the RN in the received forwarded information; if is the RN less than a preset value, it is indicated that the tourist terminal is at the scenery spot labelled with the ID; otherwise, it is indicated that the tourist terminal is not at the scenery spot labelled with ID.

When sending the reply information to the guide information sending terminal, the tourist terminal outside the radio transceiving range of the guide information sending terminal sends the reply information to the guide information sending terminal by taking the tourist terminal sending the forwarded information thereto as a forwarding terminal for the reply information.

The disclosure may further provide a notification system for a scenery area based on an Ad Hoc network, including a guide information sending terminal, a tourist terminal inside a radio range and a tourist terminal outside the radio range, wherein the guide information sending terminal is configured to send guide information periodically, receive reply information from the tourist terminals inside and outside the radio range, and determine the number of tourists at a scenery spot where it is located according to the received reply information;

the tourist terminal inside the radio range is configured to, after receiving the guide information, generate forwarded information and broadcast it, and then send reply information to the guide information sending terminal; and the tourist terminal outside the radio range is configured to, after receiving the forwarded information, generate its own forwarded information and forward it, judge whether itself is at the scenery spot where the guide information sending terminal is located according to the forwarded information, and if so, send reply information to the guide information sending terminal.

The disclosure may further provide a terminal, which is configured to send guide information periodically, receive reply information from a tourist terminal inside a radio range and a tourist terminal outside a radio range, and determine the number of tourists at a scenery spot where the terminal is located according to the received reply information.

The disclosure may further provide a terminal, which is configured to, after receiving guide information, generate forwarded information and broadcast it, and then send reply information to a guide information sending terminal.

The disclosure may further provide a terminal, which is configured to, after receiving forwarded information, generate its own forwarded information and forward it, judge whether the terminal itself is at a scenery spot where a guide information sending terminal is located according to the forwarded information, and if so, send reply information to the guide information sending terminal.

According to the notification method, the notification system and the terminals in a scenery area based on an Ad Hoc network provided by the disclosure, a guide information sending terminal is arranged at each scenery spot in the scenery area; the guide information sending terminal sends guide information periodically; a tourist terminal inside a radio transceiving range of the guide information sending terminal, after receiving the guide information, generates forwarded information and broadcasts it, and then sends reply information to the guide information sending terminal; a tourist terminal outside the radio transceiving range of the guide information sending terminal, after receiving the forwarded information, generates its own forwarded information and forwards it, and further judges whether itself is at the scenery spot where the guide information sending terminal is located according to the forwarded information, and if so, it sends reply information to the guide information sending terminal; and the guide information sending terminal determines the number of tourists at the scenery spot where it is located according to the received reply information. In the disclosure, the guide information sending terminal sends guide information periodically, so that the number of tourists at the scenery spot included in the guide information is updated in real time, and the tourists can know the number of tourists at different scenery spots from the guide information or the forwarded information received.

Furthermore, the tourists can further judge whether themselves are at a scenery spot according to the forwarding times of guide information, namely, they can judge which scenery spots they have visited or have not visited. Therefore, the user experience can be improved.

DETAILED DESCRIPTION

The basic idea of the disclosure is: a guide information sending terminal is arranged at each scenery spot in the scenery area; the guide information sending terminal sends guide information periodically; a tourist terminal inside a radio transceiving range of the guide information sending terminal, after receiving the guide information, generates forwarded information and broadcasts it, and then sends reply information to the guide information sending terminal; a tourist terminal outside the radio transceiving range of the guide information sending terminal, after receiving the forwarded information, generates its own forwarded information and forwards it, and further judges whether itself is at the scenery spot where the guide information sending terminal is located according to the forwarded information, and if so, it sends reply information to the guide information sending terminal; and the guide information sending terminal determines the number of tourists at the scenery spot where it is located according to the received reply information.

If the tourist terminal outside the radio transceiving range of the guide information sending terminal determines that itself is not at the scenery spot where the guide information sending terminal is located, then reply information is not sent.

In the disclosure, both the guide information sending terminal and the tourist terminals are nodes of the Ad Hoc network, and are equal in level.

The disclosure may be further described below in combination with the accompanying drawings and the embodiments in detail.

Figure 1:
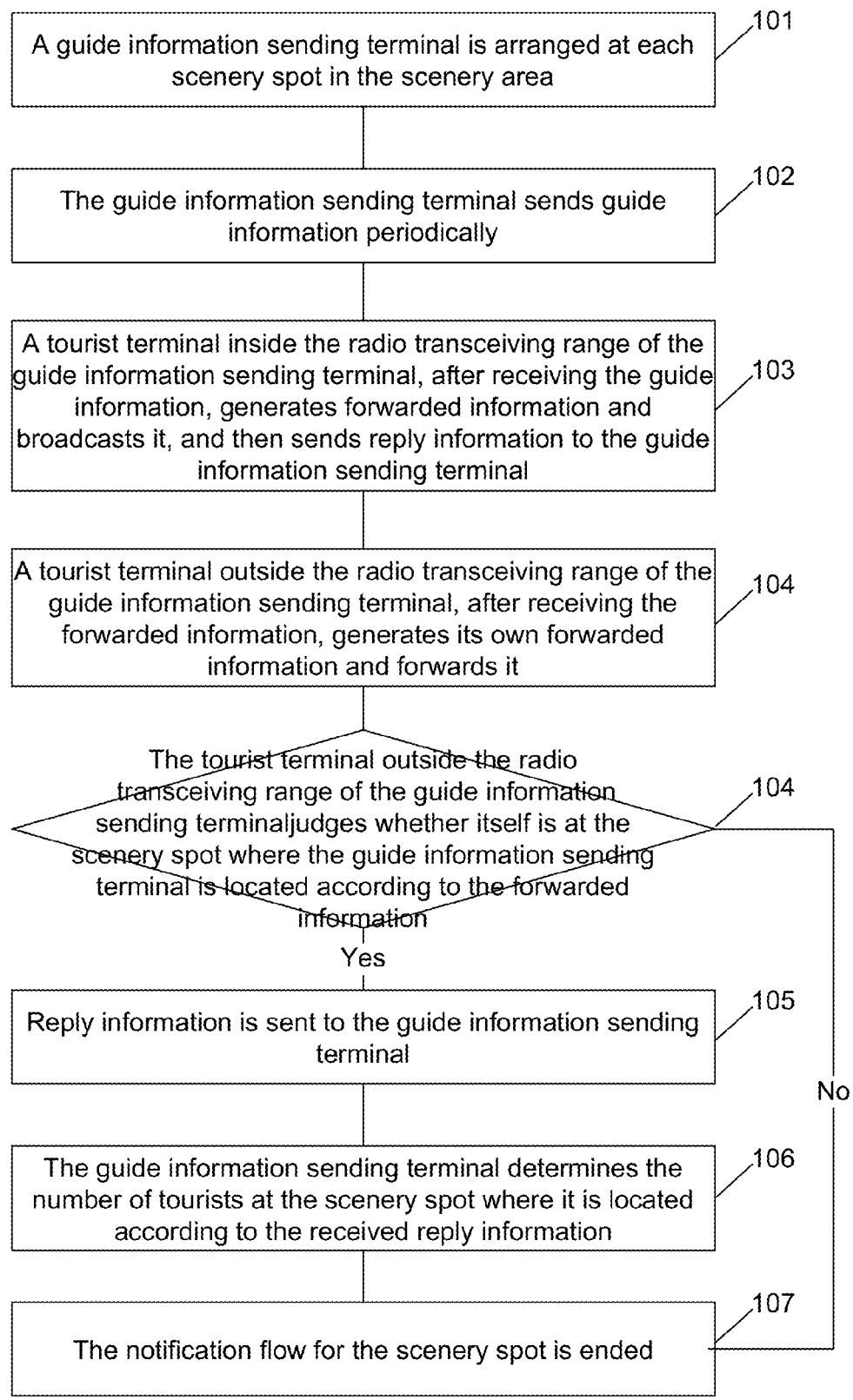
FIG. 1 is a diagram showing the implementation flow of a notification method for a scenery area based on an Ad Hoc network of the disclosure.

FIG. 1 is a diagram showing the implementation flow of a notification method for a scenery area based on an Ad Hoc network of the disclosure. As shown in FIG. 1, the following steps are included in the method.

Step 101: A guide information sending terminal is arranged at each scenery spot in the scenery area.

Here, the guide information sending terminal is correspondingly arranged at each scenery spot in the scenery area.

Step 102: The guide information sending terminal sends guide information periodically.

Specifically, the guide information sending terminal sends the guide information periodically in a form of broadcasting at a certain frequency. The guide information mainly includes the identifier (ID) of a scenery spot, the serial number (SN) of the guide information and the number of tourists (GC) nearby the scenery spot. Different scenery spots have different IDs, and the SN of a piece of guide information is obtained by adding 1 to the SN of a previous piece of guide information at the same scenery spot.

Step 103: A tourist terminal inside the radio transceiving range of the guide information sending terminal, after receiving the guide information, generates forwarded information and broadcasts it, and then sends reply information to the guide information sending terminal.

Specifically, after receiving the guide information, the tourist terminal inside the radio transceiving range of the guide information sending terminal generates the forwarded information at once and sends it in a form of broadcasting. The forwarded information includes the ID of the scenery spot, the SN of the guide information, the GC nearby the scenery spot, and the address (AD) of the tourist terminal in the received guide information, and the forwarding times (or called RN, Retransmission Number) of the forwarded information, that is, when RN=1, it is indicated that the forwarded information is forwarded for one time. According to the RN, the tourist terminal receiving the forwarded information can judge whether itself is at the scenery spot where the guide information sending terminal is located.

After generating the forwarded information and broadcasting it, the tourist terminal sends reply information to the guide information sending terminal. The reply information includes the ID of a replying scenery spot, i.e., the ID of a scenery spot where the guide information sending terminal receiving the reply information is located, AD1 of the tourist terminal, and AD2 of next hop; and because the reply information is sent to the guide information sending terminal at the moment, AD2=NULL.

The tourist terminal inside the radio transceiving range of the guide information sending terminal stores the received guide information.

Step 104: A tourist terminal outside the radio transceiving range of the guide information sending terminal, after receiving the forwarded information, generates its own forwarded information and forwards it, and judges whether itself is at the scenery spot where the guide information sending terminal is located according to the forwarded information; if so, Step 105 is executed, and otherwise, Step 107 is executed.

Specifically, if a tourist terminal outside the radio transceiving range of the guide information sending terminal cannot receive the guide information from the guide information sending terminal directly but can receive forwarded information from other tourist terminals, it also generates its own forwarded information after receiving the forwarded information, wherein the forwarded information is generated as follows: the source address (AD) in the received forwarded information is replaced with the address of the tourist terminal itself, such as AD3, 1 is added to RN, and finally, the forwarded information is sent out in a form of broadcasting. Thus, the forwarded information sent out is convenient for the tourists at other scenery spots, for example, scenery spot 2 to know the condition of the current scenery spot, such as scenery spot 1.

The tourist terminal outside the radio transceiving range of the guide information sending terminal determines whether itself is at the scenery spot labelled with ID according to the RN in the received forwarded information; if RN is less than a preset value 2, for example, RN=1, it is determined that the tourist terminal itself is at the scenery spot labelled with ID, and Step 105 is executed; and if RN is more than or equal to a preset value 2, for example, RN=2, it is determined that the tourist terminal itself is not at the scenery spot labelled with ID, and Step 107 is executed.

Here, when the tourist terminal outside the radio transceiving range of the guide information sending terminal determines that itself is at the scenery spot where the guide information sending terminal is located, the scenery spot labelled with ID can be marked visited for reference of other tourists.

The tourist terminal outside the radio transceiving range of the guide information sending terminal stores the received forwarded information.

Step 105: Reply information is sent to the guide information sending terminal.

Specifically, the tourist terminal outside the radio transceiving range of the guide information sending terminal sends reply information to the guide information sending terminal, wherein the ID of the scenery spot in the reply information is that in the forwarded information received by the tourist terminal, the terminal address is the AD1 of the tourist terminal itself, and a terminal address AD2 is further included, which is an AD corresponding to the stored ID of scenery spot, namely, the source address of the forwarded information received thereby, that is the address of the tourist terminal which sent the forwarded information, is taken as the destination address of reply information. That is to say, the reply information is forwarded to the guide information sending terminal by the tourist terminal inside the radio transceiving range of the guide information sending terminal.

The tourist terminal inside the radio transceiving range of the guide information sending terminal, after receiving the reply information, reads a scenery spot ID field in the reply information; if the tourist terminal inside the transceiving range can directly receive the guide information of the scenery spot labelled with the ID, the receiving address AD2 of next hop of the reply information is set to NULL; if the scenery spot ID field in the forwarded information or the guide information received by the tourist terminal inside the transceiving range is identical with that in the reply information, the receiving address AD2 of next hop in the reply information is replaced with an AD stored thereby and corresponding to the ID, namely, the source address of the forwarded information or the guide information received thereby is forwarded as a target address of the reply information.

Step 106: The guide information sending terminal determines the number of tourists at the scenery spot where it is located according to the received reply information.

Specifically, after the guide information sending terminal receives a piece of reply information of which the scenery spot ID field is identical with its own ID, the guide information sending terminal reads and stores AD1 of the information, i.e., a source address, and the number of tourists nearby the scenery spot can be known by counting how much reply information is received from different source addresses. The number can be shown to the tourists as a GC field in the guide information in a form of guide information or be sent to a manager at the scenery spot by a fixed network.

Step 107: The notification flow for the scenery area is ended.

The method of the disclosure is described below in combination with an embodiment in details.

Figure 2:
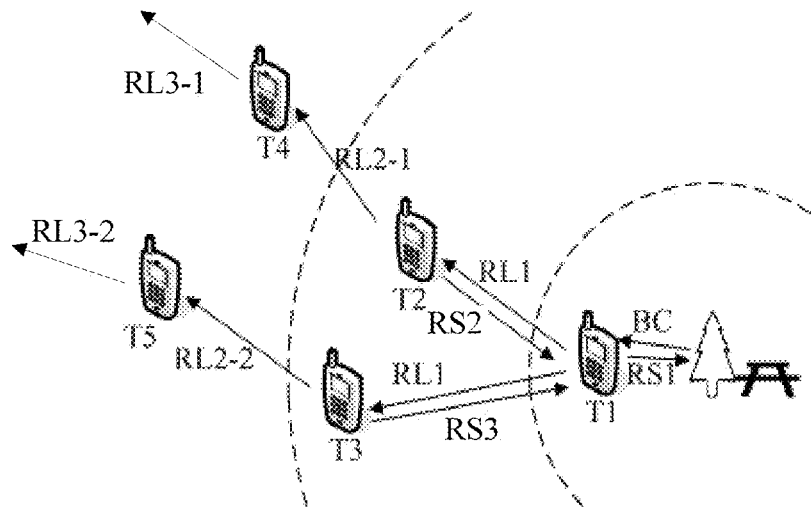
FIG. 2 is a diagram showing a network structure in an embodiment of the disclosure.

In the embodiment, it is provided that network distribution structures of a scenery spot in a scenery area and its neighbouring tourist terminals are as shown in FIG. 2, wherein the smaller dotted line circle represents an effective communication range of radio signal of a guide information sending terminal at the scenery spot, while the larger dotted line circle represents the range of tourists at the scenery spot. The implementation steps of the embodiment are as follows.

Step 1: The guide information sending terminal sends guide information BC periodically.

The contents of the guide information BC are as follows: BC.ID=1, which indicates the first scenery spot; BC.SN=100, which indicates the 100th piece of guide information sent by the guide information sending terminal at scenery spot 1, and the next piece of guide information sent by the guide information sending terminal at scenery spot 1, i.e., the 101st guide information, is represent as: BC.SN=101; and BC.GC=10, which indicates that the number of tourists at scenery spot 1 is 10.

Step 2: After a terminal T1 of tourist 1 receives the guide information BC, forwarded information RL1 is generated according to the contents of the guide information BC, and the contents of RL1 are: RL1.ID=BC.ID=1, which indicates that the contents of the forwarded information RL1 are about scenery spot 1; RL1.SN=BC.SN=100, which indicates that the 100th guide information BC of scenery spot 1 is forwarded by the terminal T1; RL1.GC=BC.GC=10, which indicates that the number of tourists inside the range of scenery spot 1 is 10; RL1.AD=T1, which indicates that the source address of the forwarded information RL1 is the terminal T1 of tourist 1; and RL1.RN=1, i.e., the forwarded information RL1, indicates that BC of the 100th piece of guide information at scenery spot 1 is forwarded for the first time.

Step 3: T1 sends reply information RS1.

RS1.ID=1 indicates that this piece of reply information is replied to scenery spot 1; RS1.AD1=T1 indicates that the source address of this piece of reply information is T1; and RS1.AD2=NULL indicates that this piece of reply information can be directly received by scenery spot 1 without being forwarded by any tourist terminal.

Step 4: After receiving RL1, T2 and T3 generates forwarded information and broadcasts it, and stores the forwarded information.

Here, the forwarded information RL1, which is sent in a form of broadcasting, can be received by tourist terminals T2 and T3 at the same time. After receiving RL1, T2 and T3 generate new forwarded information RL2-1 and RL2-2 according to the contents of RL1 respectively. RL2-1.AD=T2 indicates that the source address of the forwarded information RL2-1 is T2; RL2-2.AD=T3 indicates that the source address of the forwarded information RL2-2 is T3; RL2-1 and RL2-2 are obtained by adding 1 to the RN field in RL1, i.e., changed to be RL2, which indicates that RL2-1 and RL2-2 represent the second forwarding of the 100th guide information BC at scenery spot 1, and their forwarded information is sent in the form of broadcasting without changing other fields. Moreover, T2 and T3 store the values of RL1.ID, RL1.SN, RL1.GC, RL1.AD and RL1.RN fields obtained in RL1 in respective memories, such as 1-100-10-T1-1.

Step 5: T2 and T3 judge whether they themselves are at scenery spot 1 according to the value of the RL1.RN field; and if so, a piece of reply information is sent.

In the embodiment, when T2 and T3 receive a piece of forwarded information forwarded for the first time, it is indicated that they are inside the neighbouring range of the scenery spot where the forwarded information is from; namely, it is determined that T2 and T3 are at scenery spot 1, wherein the range can be set according to the actual condition of each scenery spot. Meanwhile, T2 and T3 mark scenery spot 1 as visited and send reply information respectively. The reply information sent by T2 is RS2 (RS2.ID=1); RS2.AD1=T2, which indicates that the source address of this reply information is T2; and T2 further queries the information 1-100-10-T1-1 saved in the memory to obtain that the address of next hop of the reply information replied to scenery spot 1 is T1, so RS2.AD2=T1. The method for sending reply information RS3 by T3 is the same as that for sending reply information RS2 by T2, namely, RS3.ID=1; RS3.AD1=T3; RS3.AD2=T1.

Step 6: After receiving the reply information RS2 from T2, T1 reads RS2.AD2=T1 to know that T2 sets the address of next hop of RS2 as itself, and then reads RS2.ID=1 to know that this reply information is replied for scenery spot 1, so that RS2.AD2 is revised as NULL and is sent to the guide information sending terminal at scenery spot 1 without changing other fields. When receiving reply information RS3 from T3, T1 also executes the same operation.

Step 7: After receiving the forwarded information RL2-2 from T3, T5 executes reading and forwarding operation similarly to T3 to send the forwarded information. The difference is that since this forwarded information represents the second forwarding of the 100th guide information at scenery spot 1, T5 may determine that the distance between itself and scenery spot 1 can be regarded to be outside the neighbouring range of scenery spot 1. Therefore, T5 does not need to send reply information to scenery spot 1 and only needs to save the information in RL2-2 to its own memory, such as, 1-100-10-T3-2, and then generates its own forwarded information and sends it by broadcasting.

The forwarded information RL3-2 generated by T5 includes: RL3-2.AD=T5, RL3-2.RN=3, RL3-2.ID=BC.ID=1, RL3-2.SN=BC.SN=100 and RL3-2.GC=BC.GC=10. After receiving forwarded information from T2, T4 performs operation similarly to T5, and sends forwarded information RL3-1, thereby needing no further description.

Step 8: After receiving reply information, the guide information sending terminal at scenery spot 1 can know that tourist terminals T1, T2 and T3 are nearby itself by reading the AD1 field in the reply information, and thus can update the GC field in the guide information BC sent subsequently.

It should be noted that the forwarded information is sent in a form of non-directional broadcasting, namely, other tourist terminals inside the radio communication range of the tourist terminal sending the forwarded information can also receive the forwarded information and these tourist terminals also need to forward new forwarded information in a form of broadcasting, so it is necessary to make a forwarding rule or condition to avoid the inundation and loopback of the forwarded information.

In the embodiment, the forwarding rule is made as follows:

Rule 1: tourist terminals inside the radio communication range of the guide information sending terminal at a scenery spot do not need to forward and reply any forwarded information about the scenery spot. As shown in FIG. 2, RL2-1 and RL2-2 which are respectively forwarded by T2 and T3 after RL1 is received by T2 and T3 can be further received by T1 besides T4 and T5. T1 can directly receive guide information BC from the guide information sending terminal at scenery spot 1, so no operation is needed after the forwarded information of which ID field is 1 is received;

Rule 2, a tourist terminal outside the radio communication range of the guide information sending terminal at a scenery spot, after receiving a piece of forwarded information about the scenery spot, needs to judge whether forwarding is required according to the ID, SN and RC fields in the forwarded information. By querying the data saved in the memory, for the information having been forwarded, the forwarded information which is received subsequently and has equal ID and SN fields and a larger or an equal RC field value is not forwarded any more. As shown in FIG. 2, T3 can receive the forwarded information RL1 from T1 and the forwarded information RL2-1 from T2, and RL1 reaches earlier than RL2-1 in term of timeline. When T3 does not receive any forwarding of the 100th guide information BC at scenery spot 1 before receiving RL1, namely, no record like 1-100-XX-XX-X exists in the memory when RL1 is received, the contents of RL1 are read to generate 1-100-10-T1-1 as above and forward RL2-2. At the moment, T3 receives RL2-1 from T2; by reading RL2-1, it can be known that RL2-1.ID=1, RL2-1.SN=100 and RL2-1.RC-2; and by querying the record 1-100-10-T1-1 in the memory, it can be known that the less forwarded information of the 100th guide information BC about scenery spot 1 has been forwarded, so that RL2-1 is not forwarded. For T5 which can receive RL2-1 and RL2-2, if RL2-2 reaches earlier than RL2-1, only RL2-2 is forwarded according to the same rule and RL2-1 is not processed; on the contrary, if RL2-1 reaches earlier than RL2-2, only RL2-1 is forwarded.

Figure 3:
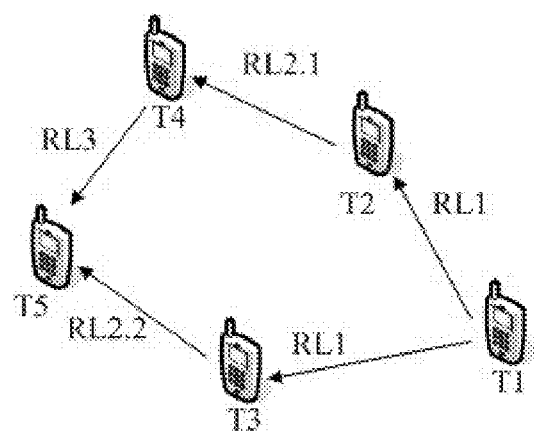
FIG. 3 is a diagram showing a network structure of forwarding rule 2 in an embodiment of the disclosure.

In addition, the Ad Hoc network adopts a Carrier Sense Multiple Access with Collision Detection (CSMA/CD) mechanism at an access layer, so there may be a random waiting delay before a tourist terminal sends information, and due to the delay, the forwarded information forwarded for more times may reach a tourist terminal earlier than that forwarded for fewer times. In the embodiment, as shown in FIG. 3, both RL3 and RL2-2 are from the same guide information BC; and due to the waiting delay of T3, RL3 reaches T5 earlier than RL2-2. Meanwhile, if T3 sends RL2-2 to T5 successfully during the sending waiting period of T5 and the RC field of RL2-2 is less than RL3, T5 may update the record in the memory according to the information of RL2-2 and regenerate forwarded information. If T3 does not send RL2-2 during the sending waiting period of T5, T5 may send forwarded information which is generated according to RL3; and then T3 sends RL2-2 to T5 successfully. Because the RC field of RL2-2 is less than RL3, T5 may update the record in the memory according to RL2-2 and further generate new forwarded information and resends it. Due to the access waiting, the same tourist terminal may forward the same guide information BC repeatedly in order that a distance can be estimated precisely according to the RC field of the forwarded information; and the repeated forwarding may be offset along with the sending waiting of the following tourist terminals.

The disclosure may further provide a notification system for a scenery area based on an Ad Hoc network, including a guide information sending terminal, a tourist terminal inside a radio range and a tourist terminal outside the radio range, wherein the guide information sending terminal is configured to send guide information periodically, receive reply information from the tourist terminals inside and outside the radio range, and determine the number of tourists at the scenery spot where the guide information sending terminal itself is located according to the received reply information;

the tourist terminal inside the radio range is configured to, after receiving the guide information, generate forwarded information and broadcast it, and then send reply information to the guide information sending terminal; and the tourist terminal outside the radio range is configured to, after receiving the forwarded information, generate its own forwarded information and forward it, judge whether the tourist terminal outside the radio range itself is at the scenery spot where the guide information sending terminal is located according to the forwarded information, and if so, send reply information to the guide information sending terminal.

The disclosure may further provide a terminal, which is configured to send guide information periodically, receive reply information from a tourist terminal inside a radio range and a tourist terminal outside a radio range, and determine the number of tourists at the scenery spot where it is located according to the received reply information.

The disclosure may further provide a terminal, which is configured to, after receiving guide information, generate forwarded information and broadcast it, and then send reply information to a guide information sending terminal.

The disclosure may further provide a terminal, which is configured to, after receiving forwarded information, generate its own forwarded information and forward it, judge whether the terminal itself is at the scenery spot where a guide information sending terminal is located according to the forwarded information, and if so, send reply information to the guide information sending terminal.

The above are only the embodiments of the disclosure, and are not intended to limit the range of protection of the claims of the disclosure.

What is claimed is:

1. A notification method for a scenery area based on an Ad Hoc network, comprising arranging a guide information sending terminal at each scenery spot in a scenery area, and further comprising:

sending, by the guide information sending terminal, guide information periodically; and after a tourist terminal inside a radio transceiving range of the guide information sending terminal receives the guide information, generating and broadcasting forwarded information by the tourist terminal inside the radio transceiving range of the guide information sending terminal, and then sending reply information by the tourist terminal inside the radio transceiving range of the guide information sending terminal to the guide information sending terminal;

after a tourist terminal outside the radio transceiving range of the guide information sending terminal receives the forwarded information, generating and forwarding, by the tourist terminal outside the radio transceiving range of the guide information sending terminal, its own forwarded information, then judging whether the tourist terminal outside the radio transceiving range of the guide information sending terminal itself is at a scenery spot where the guide information sending terminal is located according to the forwarded information, and if so, sending a piece of reply information by the tourist terminal outside the radio transceiving range to the guide information sending terminal; and determining, by the guide information sending terminal, the number of tourists at the scenery spot where the guide information sending terminal is located according to the reply information received;

wherein judging whether the tourist terminal outside the radio transceiving range of the guide information sending terminal itself is at the scenery spot where the guide information sending terminal is located according to the forwarded information comprises:

determining, by the tourist terminal outside the radio transceiving range of the guide information sending terminal, whether itself is located at the scenery spot labelled with an identifier (ID) according to retransmission number (RN) in the forwarded information received; if is the RN is less than a preset value, indicating that the tourist terminal outside the radio transceiving range of the guide information sending terminal is at the scenery spot labelled with the ID; otherwise, indicating that the tourist terminal outside the radio transceiving range of the guide information sending terminal is not at the scenery spot labelled with the ID.

2. The notification method for a scenery area based on an Ad Hoc network according to claim 1, wherein the guide information comprises an identifier (ID) of the scenery spot, a Serial Number (SN) of the guide information and the number of tourists (GC) nearby the scenery spot.

3. The notification method for a scenery area based on an Ad Hoc network according to claim 2, wherein when the tourist terminal outside the radio transceiving range of the guide information sending terminal sends the reply information to the guide information sending terminal, the tourist terminal outside the radio transceiving range of the guide information sending terminal takes a tourist terminal sending the forwarded information to the tourist terminal outside the radio transceiving range of the guide information sending terminal as a forwarding terminal for the reply information, and sends the reply information to the guide information sending terminal.

4. The notification method for a scenery area based on an Ad Hoc network according to claim 1, wherein the forwarded information comprises an ID of the scenery spot, an SN of the guide information, a GC nearby the scenery spot, and an Address (AD) of the tourist terminal sending the forwarded information in the guide information or the forwarded information, and a retransmission number (RN) of the forwarded information.

5. The notification method for a scenery area based on an Ad Hoc network according to claim 4, wherein when the tourist terminal outside the radio transceiving range of the guide information sending terminal sends the reply information to the guide information sending terminal, the tourist terminal outside the radio transceiving range of the guide information sending terminal takes a tourist terminal sending the forwarded information to the tourist terminal outside the radio transceiving range of the guide information sending terminal as a forwarding terminal for the reply information, and sends the reply information to the guide information sending terminal.

6. The notification method for a scenery area based on an Ad Hoc network according to claim 1, wherein the reply information comprises an ID of the scenery spot where the guide information sending terminal receiving the reply information is located, AD1 of the tourist terminal sending the reply information, and AD2 of next hop receiving reply information.

7. The notification method for a scenery area based on an Ad Hoc network according to claim 6, wherein when the tourist terminal outside the radio transceiving range of the guide information sending terminal sends the reply information to the guide information sending terminal, the tourist terminal outside the radio transceiving range of the guide information sending terminal takes a tourist terminal sending the forwarded information to the tourist terminal outside the radio transceiving range of the guide information sending terminal as a forwarding terminal for the reply information, and sends the reply information to the guide information sending terminal.

8. The notification method for a scenery area based on an Ad Hoc network according to claim 1, wherein when the tourist terminal outside the radio transceiving range of the guide information sending terminal sends the reply information to the guide information sending terminal, the tourist terminal outside the radio transceiving range of the guide information sending terminal takes a tourist terminal sending the forwarded information to the tourist terminal outside the radio transceiving range of the guide information sending terminal as a forwarding terminal for the reply information, and sends the reply information to the guide information sending terminal.

9. A notification system based on an Ad Hoc network, comprising a guide information sending terminal, a tourist terminal inside a radio range and a tourist terminal outside the radio range, wherein the guide information sending terminal is configured to send guide information periodically, receive reply information from the tourist terminals inside and outside the radio range, and determine the number of tourists at a scenery spot where the guide information sending terminal is located according to the received reply information;

the tourist terminal inside the radio range is configured to, after receiving the guide information, generate and broadcast forwarded information, and then send the reply information to the guide information sending terminal; and the tourist terminal outside the radio range is configured to, after receiving the forwarded information, generate and forward its own forwarded information, judge whether the tourist terminal outside the radio range itself is at the scenery spot where the guide information sending terminal is located according to the forwarded information, and if so, send the reply information to the guide information sending terminal;

the tourist terminal outside the radio range is further configured to determine whether itself is located at the scenery spot labelled with an identifier (ID) according to retransmission number (RN) in the forwarded information received; if is the RN is less than a preset value, indicate that the tourist terminal outside the radio transceiving range of the guide information sending terminal is at the scenery spot labelled with the ID; otherwise, indicate that the tourist terminal outside the radio transceiving range of the guide information sending terminal is not at the scenery spot labelled with the ID.

10. A terminal, which comprises:

a memory storing programming instructions; and a processor configured to execute the stored programming instructions to perform steps comprising:

after receiving forwarded information, generating and forwarding its own forwarded information, judging whether the terminal itself is at a scenery spot where a guide information sending terminal is located according to the forwarded information, and if so, sending reply information to the guide information sending terminal;

wherein judging whether the terminal itself is at the scenery spot where the guide information sending terminal is located according to the forwarded information comprises:

determining whether the terminal itself is located at the scenery spot labelled with an identifier (ID) according to retransmission number (RN) in the forwarded information received; if is the RN is less than a preset value, indicating that the tourist terminal outside the radio transceiving range of the guide information sending terminal is at the scenery spot labelled with the ID; otherwise, indicating that the tourist terminal outside the radio transceiving range of the guide information sending terminal is not at the scenery spot labelled with the ID.

\* \* \* \* \*